United States Patent
Jaramillo et al.

(10) Patent No.: US 11,832,635 B2
(45) Date of Patent: Dec. 5, 2023

(54) PROCESS FOR THE PRODUCTION OF FUNCTIONAL FOOD

(71) Applicants: Carmenza Jaramillo, Manizales (CO); Santiago Restrepo Gutierrez, Manizales (CO); Alejandro Echeverri Jaramillo, Manizales (CO); Sergio Restrepo Gutierrez, Manizales (CO)

(72) Inventors: Carmenza Jaramillo, Manizales (CO); Santiago Restrepo Gutierrez, Manizales (CO); Alejandro Echeverri Jaramillo, Manizales (CO); Sergio Restrepo Gutierrez, Manizales (CO)

(*) Notice: Subject to any disclaimer, the term of this patent is extended or adjusted under 35 U.S.C. 154(b) by 132 days.

(21) Appl. No.: 16/179,666

(22) Filed: Nov. 2, 2018

(65) Prior Publication Data

US 2019/0230957 A1    Aug. 1, 2019

(30) Foreign Application Priority Data

Feb. 1, 2018    (CO) .................. NC2018/0001097

(51) Int. Cl.
*A23K 10/37*    (2016.01)
*A23L 33/00*    (2016.01)
(Continued)

(52) U.S. Cl.
CPC ............. *A23K 10/37* (2016.05); *A23K 10/18* (2016.05); *A23K 10/30* (2016.05); *A23K 20/147* (2016.05);
(Continued)

(58) Field of Classification Search
CPC ........ A23K 10/30; A23K 20/20; A23K 10/18; A23K 20/147; A23K 10/37; A23K 20/158; A23L 33/30; A23L 33/105; A23V 2002/00
See application file for complete search history.

(56) References Cited

U.S. PATENT DOCUMENTS

| | | |
|---|---|---|
| 7,178,285 B2 | 2/2007 | Miller et al. |
| 9,068,171 B2 | 6/2015 | Kelly et al. |
| (Continued) | | |

FOREIGN PATENT DOCUMENTS

| | | |
|---|---|---|
| BR | 102013020160 A2 | 8/2015 |
| CN | 1335096 A | 2/2002 |
| (Continued) | | |

OTHER PUBLICATIONS

Leifa et al. Production of Flammulina velutipes on Coffee Husk and Coffee Spent-ground. Brazilian Archives of Biology and Technology (2001), 44(2), 205-212. (Year: 2001).*

(Continued)

*Primary Examiner* — Sean C. Barron

(57) ABSTRACT

A product named functional food, and in one of its presentations, it consists of a powder made up with coffee and/or cocoa by-products which are myceliated with macromycete or entomopathogenic macromycete. The latter are produced, mixed and enriched with nutrients from its own cultivation substrate. The result is an innovative product that is rich in protein, polysaccharides, antioxidants and low in caffeine. The functional food obtained has an increase of 15% to 20% in protein with respect to the initial byproduct and a notable increase in the amount of antioxidants This is attributed to the initial substrate and the activity of the mushrooms that are cultivated in it.

7 Claims, 3 Drawing Sheets

(51) Int. Cl.
*A23K 10/18* (2016.01)
*A23L 33/105* (2016.01)
*A23K 20/158* (2016.01)
*A23K 20/147* (2016.01)
*A23K 10/30* (2016.01)
*A23K 20/20* (2016.01)

(52) U.S. Cl.
CPC ............ *A23K 20/158* (2016.05); *A23K 20/20* (2016.05); *A23L 33/105* (2016.08); *A23L 33/30* (2016.08); *A23V 2002/00* (2013.01)

(56) References Cited

U.S. PATENT DOCUMENTS

| | | | |
|---|---|---|---|
| 2009/0220667 A1* | 9/2009 | Johnson | A23F 5/14 426/595 |
| 2014/0302560 A1 | 10/2014 | Kelly | |
| 2015/0257406 A1* | 9/2015 | Kelly | A23G 1/02 426/45 |
| 2016/0249660 A1 | 9/2016 | Lagan et al. | |
| 2017/0156383 A1 | 6/2017 | Langan et al. | |
| 2017/0295837 A1 | 10/2017 | Soni et al. | |

FOREIGN PATENT DOCUMENTS

| | | |
|---|---|---|
| ES | 2733912 | 12/2019 |
| KR | 20140050236 A | 11/2014 |
| WO | 2011032244 A1 | 3/2011 |
| WO | 2014145256 | 9/2014 |
| WO | 2014145265 A2 | 11/2014 |
| WO | 2017181085 | 10/2017 |

OTHER PUBLICATIONS

Zervakis et al. Mycelium Growth Kinetics and Optimal Temperature Conditions for the Cultivation of Edible Mushroom Species on Lignocellulosic Substrates. Folia Micriobiol (2001), 46(3), 231-234. (Year: 2001).*

"Theory of Sterilization". Internet article (2013), 2 pages. (Year: 2013).*

Zhang et al. Characterization of stipe and cap powders of mushroom (*Lentinus edodes*) prepared by different grinding methods. Journal of Food Engineering (2012), 109(3), 406-413. (Year: 2012).*

A nutritional analysis on the by-product coffee husk and its potential utilization in food production, Ebba Bondesson, 2015.

* cited by examiner

Flow chart of the coffee process up to the cup

Process of obtaining functional food object of this invention

US 11,832,635 B2

PROCESS FOR THE PRODUCTION OF FUNCTIONAL FOOD

CROSS-REFERENCE TO RELATED APPLICATIONS

This application claims the benefit of Coumbia Application No. NC2018/0001097 entitled ALIMENTO FUNCIONAL Y PROCESO PARA SU OBTENCION, filed Feb. 1, 2018, the disclosure of which is hereby incorporated by reference in its entirety.

FIELD OF THE INVENTION

The invention herein is related to both agronomical and chemical engineering; more particularly, to leveraging by-products from the cultivation, processing and industrializing of coffee and cocoa. These by-products are transformed by using entomopathogenic macromycetes and macromycetes.

BACKGROUND OF THE INVENTION

In the coffee and cocoa industries, there is great difficulty in disposing and reusing large volumes of waste produced, such as coffee and cocoa by-products. These waste materials are underused because of their high content of tannic acid, chlorogenic acid and fibers of difficult decomposition. These under-utilized by-products have low digestibility because of their high content of organic matter, such as proteins, amino acids and others. These materials are also highly polluting because of their content of protein, amino acids and other elements. As a result, oftentimes these materials are disposed of in open fields or thrown in rivers and streams.

It is worth noting that foods with a high content of protein such as beef and pork are relatively more expensive than other foods and raise serious environmental and ethical concerns, especially when undertaken at an industrial scale.

In addition, foods rich in protein are expensive and have a large environmental footprint. It is worth mentioning that developing countries still have a large need of low-cost protein; these are some of the countries that produce the largest amounts of agricultural by-products.

Previous solutions to the problem of increasing protein content use macromycetes. For instance, patent WO2017181085A consists in a method for the production and use of myceliated food compositions, which have a high protein content. This patent shows a method to create a food product that is high in myceliated protein, which involves cultivating the mushroom in an aqueous medium with high levels of protein; for instance, at least 20 grams of protein per 100 g of dry weight with excipients, in dry weight. After the cultivation, the material is harvested, and a food product high in myceliated protein is obtained through drying or concentration.

Another state of the art patent is U.S. Pat. No. 9,068,171B2, which executes the myceliation process on green coffee beans, uses agitation techniques to produce spheres of hyphae 10 μm to 10 mm of diameter. The use of this patent increases the efficacy of the inoculation during fermenting in solid state because the spheres grow in all directions. The techniques of agitation and fermentation whirlpool in liquid state include: mechanical cuts using magnetic agitation bars, stainless steel drivers, high-pressure sterile air injection, high pressure injection of sterile media and/or the use of agitating tables. The higher speeds of agitation and turbulence, and the injection of air and media, produce smaller mycelial spheres, aliquots of which are used to inoculate agricultural substrates of solid state for the posterior semi-aerobic fermentation. This process has long incubation times and has processes with mechanical agents and requires a large amount of expensive equipment. In addition, this patent has steps and components that features a "liquid state cultivation" for agricultural materials The technology described in US Publication No. 20150257406A1 uses products from myceliated cocoa and methods to produce myceliated products from green cocoa and other agricultural substrates. This publication supplies a method for the preparation of a bean of myceliated cocoa or another agricultural product. This method involves supplying cocoa grains or other agricultural substrates, optionally hydrating the cocoa grains or other agricultural products and optionally having pasteurization or sterilization of the cocoa grains or the other agricultural substrates to supply grains of cocoa that are myceliated.

The methods of US Publication No. 20150257406A1 result in prepared cocoa grains (or other agricultural substrates) which have reduced levels of undesired flavors such as theobromine, catechin, epicatechin, equivalents of gallic acid and/or 2-metoxi-3-isopropilpirazine. This invention also results in augmented levels of the myceliation process, such as fungical β-glucans, chitin, proteins, glycoproteins, pyrazines and polysaccharides in relation to the start of the cocoa grains or other agricultural substrate. The main objective of US Publication No. 20150257406A1 is to improve the flavor and improve upon other problems in the cocao grain. US Publication No. 20150257406A1 does not involve the by-products generated in the process.

Another related invention is U.S. Pat. No. 7,178,285B2. This invention is based in the treatment of purple corn, black corn, purple barley and purple rice with liquid inoculum, where the incubation times depend on each one of the grains. The cocoa grain is used as the final product of the cocoa harvest and industrial process; here, the solid material is sterilized before being introduced in the reactor, in some cases pasteurized. The chemical compositions of the green cocoa grain contain at least 57% of grease (cocoa butter) and 15,625 of protein. The invention uses laboratory equipment such as reactors and liquid and solid fermenters. The final product is a conventional food that was already valuable and digestible since the beginning and prior to the mentioned process.

Another document, US Publication No. 20170156383A1A is directed to a method for enhancing the taste of a food product, which includes the steps of culturing a mycelial liquid tissue culture in a media, collecting a mycelium-free portion of the mycelial liquid tissue culture, e.g., the supernatant fluid of the mycelial liquid tissue culture, and adding the collected supernatant fluid to a food product in an amount sufficient to enhance the food product's taste. The mycelial liquid tissue culture may include *C. sinensis*, and the culture step may be carried out for between about one and sixty days. The food products include non-nutritive sweeteners, alcoholic beverages, teas, coffees, bitter tasting foods such as cranberry, grapefruit, pomegranate, and coconut, as well as dietary supplements, food additives, pharmaceuticals, and nutraceuticals.

U.S. Pat. No. 7,178,285 B2 describes a method to increase the amounts of one or more functional composites in mushrooms, via cultivating the mushrooms over a substrate that is high in functional composites or interest composites. This method involves supplying a substrate with one or more anthocyanins and cultivating mushrooms over the substrate. The mushrooms are cultivated over a substrate rich in anthocyanins, such as purple corn or other adequate red, purple or dyed black substrate. The mushrooms incorporate the anthocyanins during their growth. Also, the process provides mushrooms cultivated using this methodology, and methods to improve the speed of growth and the power of the mushrooms. This methodology strives to improve the amount of anthocyanins in final harvested products or well-known market ready products, in this case several kinds of grains of corn and rice.

WO 2014145256 A1 describes a method for the preparation of myceliated coffee products in which the process is effected over the sterilized green coffee beans. The process attempts to reduce the number of undesirable components, reduce chlorogenic acid, reduce unsavory flavors, reduce amounts of caffeine and an increase in polysaccharides and B-glucans. Once again, the final product is a conventional food that was already valuable and digestible since the beginning and prior to the mentioned process.

In summary, in the state of the art, there are solutions that do not focus on the use of highly pollutant by-products; instead, the focus is on final products from existing common market ready harvests. Contrary to the invention presented in this paper, these previous techniques utilize high-cost equipment and small volume yields in laboratory scales.

It is an object of the present invention to improve upon the disadvantages of the prior art.

SUMMARY OF THE INVENTION

Objects of the invention are directed to a product named functional food, and in one of its presentation. In certain embodiments, the functional food consists of a powder made up with coffee and/or cocoa by-products which are myceliated with macromycete or entomopathogenic macromycete. The latter are produced, mixed and enriched with nutrients from its own cultivation substrate.

The result is an innovative product that is rich in protein, polysaccharides, antioxidants and low in caffeine. The functional food obtained has an increase of 15% to 20% in protein with respect to the initial byproduct and a notable increase in the amount of antioxidants. This is attributed to the initial substrate and the activity of the mushrooms that are cultivated in it.

These and advantages of this invention are provided by a functional food comprising a functional food comprising: at least one of the by-products selected from the group consisting of coffee pulp, coffee husk, silver coffee film, coffee tree sawdust, coffee grounds residue, coffee mucilage, cacao shell, cacao slime, cacao husk, wherein of all or some of these by-products is mixed with a macromycete and/or an entomopathogenic macromycete.

In certain embodiments, the macromycete is at least one of the group *Pleurotus ostreatus, P. sajor-caju, P. ostreatoroseus, P. eringii, Ganoderma lucidum, G. Applanatum, Ganoderma tsugae, Flammulina velutipes, Lentinula edodes, Lentinus strigellus, Morchella esculenta, M. conica, Macrolepiota procera, Volvariella volvacea, Grifola frondosa, Agaricus bisporus, A. blazeio A. brasiliensis, A. bitorques, A. brunnensis, Armillaria melea, Armillaria lutea, Oudemansiella canarii, Pycnoporus sanguineus, P. cinabarina, Tremella fuciformis, Coprinus comatus, Coprinus cinereus, Cantharellus cibarius, Hericium erinaceus, Boletus edulis, Agrocybe* spp., *Auricularia* spp., *Inocybe* spp., *Lactarius* spp., *Trametes* spp., *Fomes* spp., *Ramaria* spp., *Suillus* spp., *Collybia* spp., *Coriolus versicolor, Pholiota nameko, Schizophyllum comune.*

In certain embodiments, the entomopathogenic macromycete is selected from the group *Cordyceps sinesis* or *Cordyceps militaris.*

In certain embodiments, the functional food is encapsulated.

In certain embodiments, the functional food is in the form of nutritional supplement.

In certain embodiments, the form of the functional food is granulated, liquid or powder.

In certain embodiments, the food is porridge, yogurt, soup, bread, biscuit, cake, dough, energy bar, cereal, forage.

Other objects of the invention are achieved by providing a process for obtaining a functional food, comprising: adaptation of the raw material composed of one of the by-products selected from the group of coffee pulp, coffee husk, silver coffee film, coffee tree sawdust, coffee grounds residue, coffee mucilage, cacao shell, cacao slime, cacao husk, or a combination thereof, wherein the adaption of the material occurs by all or some of the following steps:
a. anaerobic process;
b. draining of raw material;
c. filling bags or containers with the mixture;
d. inoculation of macromycete mycelium or entomopathogenic macromycete;
e. incubation of macromycete mycelium or entomopathogenic macromycete;
f. second incubation of macromycete or entomopathogenic macromycete;
g. selection of over-myceliated material;
h. drying of the material;
i. gross grinding of the enriched substrate;
j. fine grinding of the enriched substrate;
k. thermic treatment; and
l. packing.

In certain embodiments, the anaerobiosis time is between 10 and 20 days.

In certain embodiments, once the raw material has been removed from the water, the raw material is drained until reaching a humidity of 80 to 90%.

In certain embodiments, the incubation takes between 3 and 20 days, at a temperature of 35 to 40 degrees Celsius, with luminosity between 100 and 1500 lux.

In certain embodiments, the second incubation takes between 4 to 8 days at a temperature of 40 to 50 degrees Celsius.

In certain embodiments, the raw material is dried to obtain humidity between 10 and 15%.

In certain embodiments, the heat treatment is 120 degrees Celsius for a time between 30 and 60 minutes.

Other objects of the invention are achieved by providing a functional food obtained by the process.

In certain embodiments, the process involves obtaining active ingredients such as ergosterol, beta glucan, linoleic and oleic acid, lectins, enzymes, proteins, amino acids, vitamins, and mineral salts.

Other objects of the invention are directed to providing a process for obtaining a functional food, wherein the functional food is used in food products, nutritional supplements, cosmetic industries, herbal medicine, pharmaceuticals, textiles, paper and medicine.

Other objects of the invention are directed to providing a method for protein enrichment of food for human or animal consumption.

In certain embodiments, the method is used to strengthen the immune system of a human or animal.

Unless otherwise defined, all technical or/and scientific terms used herein have the same meaning as commonly understood by one of ordinary skill in the art to which the invention pertains. Although methods and materials similar or equivalent to those described herein can be used in the practice or testing of embodiments of the invention, exemplary methods or/and materials are described below. In case of conflict, the patent specification, including definitions, will control. In addition, the materials, methods, and examples are illustrative only and are not intended to be necessarily limiting.

BRIEF DESCRIPTION OF THE DRAWINGS

The invention herein is related to both agronomical and chemical engineering; more particularly, to leveraging by-products from the cultivation, processing and industrializing of coffee and cocoa. These by-products are transformed by using entomopathogenic macromycetes and macromycetes.

DETAILED DESCRIPTION OF THE INVENTION

Figure 1:
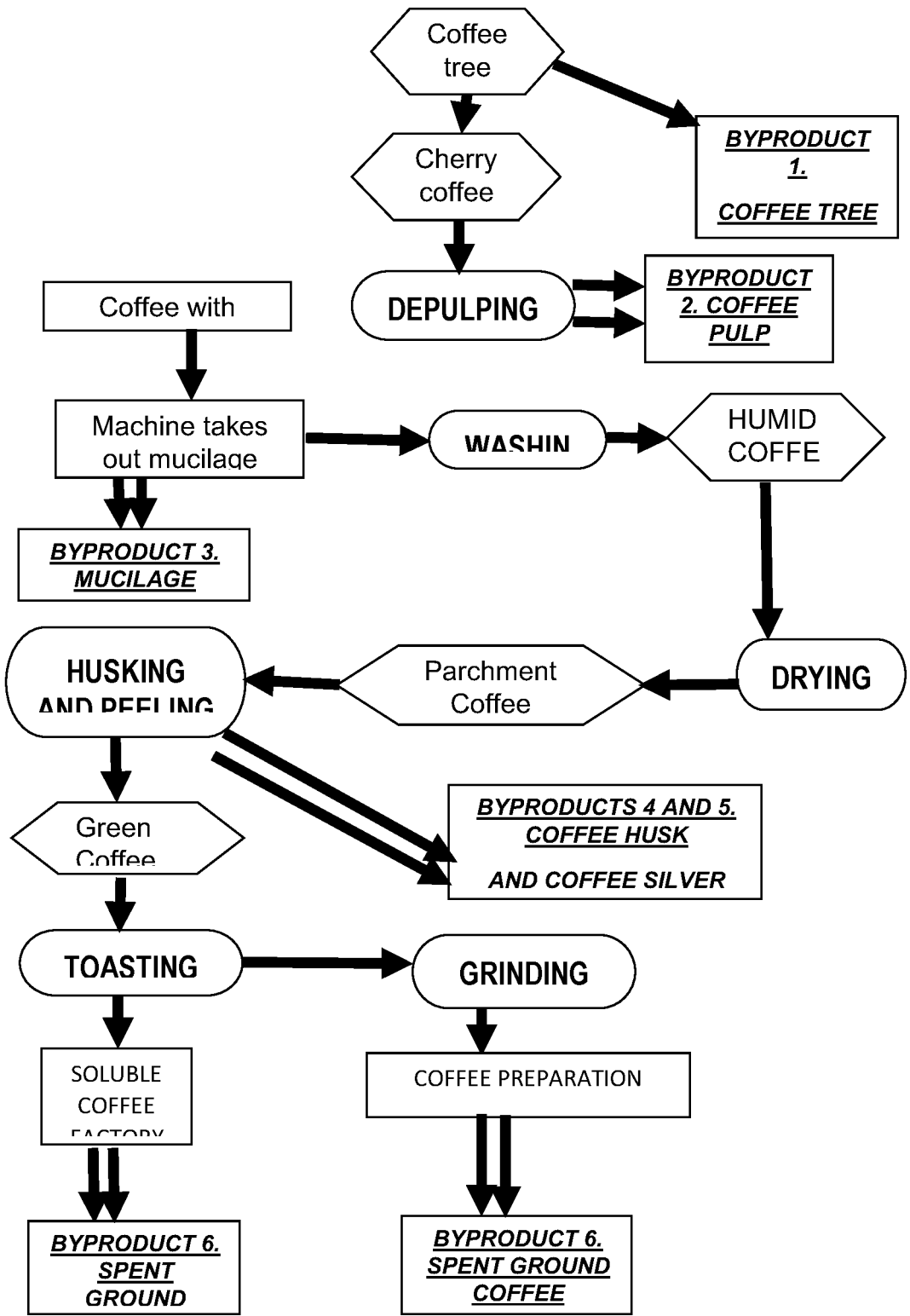
FIG. 1 is directed to a process of obtaining the coffee from its harvesting up to the cup, including the reference to by-products with double arrow.
Figure 2:
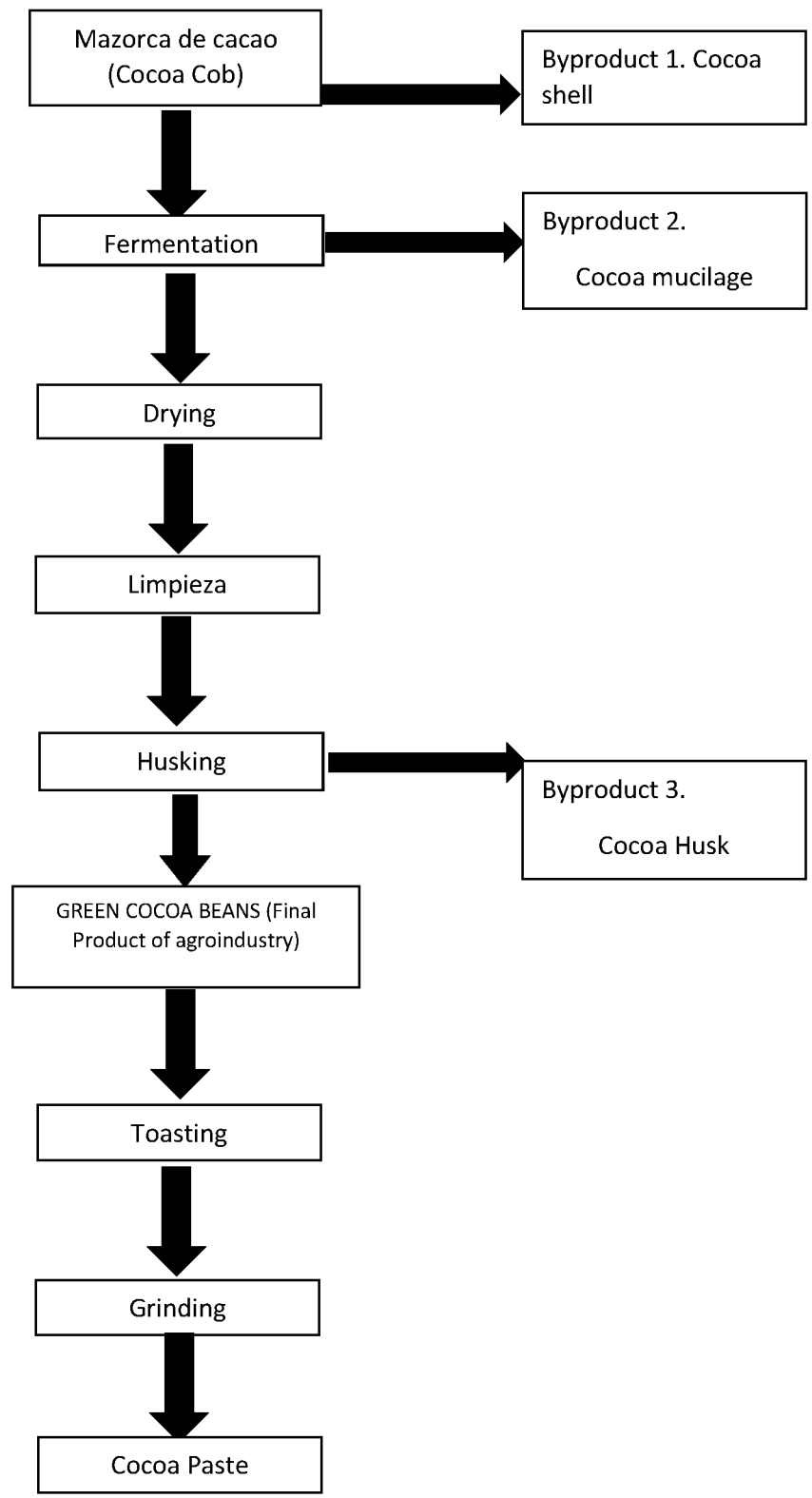
FIG. 2 describes the process of the cacao post-harvest process and its by-products.

It is understood that the invention is not limited to the particular methodology, devices, items or products etc., described herein, as these may vary as the skilled artisan will recognize. It is also to be understood that the terminology used herein is used for the purpose of describing particular embodiments only and is not intended to limit the scope of the invention. The following exemplary embodiments may be described in the context of exemplary bedding articles for ease of description and understanding. However, the invention is not limited to the specifically described products and methods and may be adapted to various applications without departing from the overall scope of the invention. All ranges disclosed herein include the endpoints. The use of the term "or" shall be construed to mean "and/or" unless the specific context indicates otherwise.

There is great difficulty in the use and final disposal of large volumes of by-products from the coffee and cocoa industries. These by-products, which are underutilized, have low digestibility due to their high content of tannins, chlorogenic acids and fiber of difficult decomposition and are highly polluting because of their organic matter content such as proteins, amino acids and other elements, are left to free exposure in the fields and sometimes are dumped in rivers.

In addition to the above, it is in the coffee and cocoa byproducts where antioxidants, original protein, vitamins and minerals are found and are not used for their bad taste and poor digestibility; this invention rescues and improves these hidden pre-existing qualities in the by-products, which were impossible to access in the original state of the by-product's structure.

As it can be seen in the state of the art on chemical composition of the cocoa husk and the mucilage, these byproducts have physicochemical properties with high potential for food, however, they are discarded precisely because of their difficult use due to their high concentration, fibers, chlorogenic acids and other components on which a process for its use as food is unknown.

Now, in the field of food products at low cost, mushrooms have been treated and used in the food and pharmacological industry quite regularly, mostly macromycetes, as enriching agents for crops and processes, some of the best known for their properties are the *Lentinula edodes, Pleurotus sajor-caju, Pleurotus florida, Hypsizygus marmoreus* and *Ganoderma lucidum*, which focus on the treatment of products that are high in lignocellulose are used for other solutions and mixtures.

Additionally and from another perspective, foods with a high protein content are increasingly scarce and expensive, which makes them difficult to access without knowing substitute alternatives to the usual ones, it is important to note that third world countries are those with the greatest amount of food needs, being in turn the ones that produce the greatest amount of agricultural by-products.

If there was a suitable methodology for the use of by-products, a great contribution could be made to the nutritional needs of these people; this invention precisely develops a methodology that allows the effective use of these by-products opening an immense range of possibilities of food solutions and environmental solutions.

In the state of the art, we then find solutions focused on the use of not by-products but existing products, or final products of existing crops in the market and using technologies that mostly use expensive of equipment and laboratory scale, situation that differs from that of this invention, where these circumstances are different.

According to the foregoing, the solution provided by this invention is a development that exploits, enriches, digestifies and improves the palliative qualities of byproducts resulting from the process of cultivation and industrialization of coffee and cocoa, through the transformation produced by the mycelium of fungi that grow directly in the by-product's biomass, decomposing the fibers, secreting enzymes, exopolisaccharides, and enriching the material with proteins, vitamins and mineral salts.

This invention refers to a product called functional food consisting, in one of its presentations, of flour composed of coffee byproducts and/or micelled cocoa with macromycete or entomopathogenic macromycete which is produced, mixed and enriched with the nutrients of its own growing substrate.

For the development of this invention the residual materials of the coffee and cocoa process are arranged from their cultivation to the industrialization of the coffee bean, these by-products are coffee pulp, coffee husk, silver coffee film, ground coffee waste, coffee tree sawdust, mucilage of coffee; for cocoa the residual materials of its process are also arranged such as cocoa pod husk, cocoa mucilage known as baba de cacao (which is pulp) and cocoa bean husk.

At the same time the inoculum is prepared and the process is developed from the inoculation of the by-products with solid mycelium under specific time, temperature, humidity and light variables in order to produce the desired effect which is to improve the physicochemical properties of the by-products, so that they become edible products, nutritional supplements of low cost and easy access, thus it is obtained as a final result after the myceliation, a functional food with characteristics of a high increase in the content of protein and antioxidants additional to the use of byproducts that otherwise contaminate the environment.

The result is particularly an innovative product rich in protein content, polysaccharides, antioxidants and low in caffeine. The functional food obtained has an increase in protein between 15 and 20% and an increase in the final amount of antioxidants due to the initial substrate and the action of the fungi grown in it.

This solution has numerous advantages since the technologies described in the state of the art above show that most of them use foods that are final products of agricultural crops as raw material, which are digestible and ready for the immediate disposition for massive consumption, this invention, on the other hand, uses rarely used by-products which present great difficulties in their exploitation and which today are not digestible and have little palatability.

The existing methodologies strictly require laboratory cultures by means of liquid fermentation in high-cost reactors, low volume and difficult scaling; the method of this invention, on the contrary, allows extensive production in low-cost culture rooms.

The advantages of this invention are represented in:
1. Mycelium of the fungus grows directly in the biomass of the by-product decomposing the fibers, secreting enzymes, exopolysaccharides and enriching the material with proteins, vitamins and mineral salts.
2. It solves the problem of food shortages, especially foods rich in protein that tend to have a higher price, which hinders access. On the other hand, there are few substitution alternatives.
3. The third world countries are those that have the greatest amount of food needs, being in turn those that have the greatest amount of agricultural by-products. This invention provides a methodology suitable for the use of by-products making a great contribution to the nutritional needs of people.
4. In the state of the art there are solutions focused on existing products or final products of the harvests, mostly using expensive equipment and on a laboratory scale. The solution to the technical problem of this invention focuses on obtaining a low-cost and replicable methodology on a large scale overcoming the limitations of existing technologies.
5. The methodologies known in the state of the art use liquid inoculum, this invention, on the contrary, uses solid inoculum.

In the byproducts we find antioxidants, protein, vitamins, minerals that were not used before because of their bad taste and poor digestibility; this invention rescues and improves these hidden pre-existing qualities in the by-products, which were impossible to access in the original state of the structure of the byproduct.

In light of this information, the solution provided by the invention provided is a development that leverages, enriches, digests and improves upon the palliative properties of coffee and cocoa industrial by-products. This is done through the transformation effected by mycelium in mushrooms that grow directly in the biomass of the subproduct, thus decomposing the fibers, secreting enzymes and exopolysaccharides and enriching the material with proteins, vitamins and mineral salts.

This solution features numerous properties because the technologies previously described use, as raw materials, foods that are the final products of agricultural harvests. The invention here described exclusively uses by-products that are rarely used and which are difficult to leverage into something useful, and are not digestible and have little palatability.

Current methods require laboratory cultivations through liquid fermentation or solid fermentation in high-cost reactors. These setups have a high cost, yield low volumes and are difficult to scale.

The methods in the state of the art use liquid inoculum and embodiments of the invention uses solid inoculum.

Figure 3:
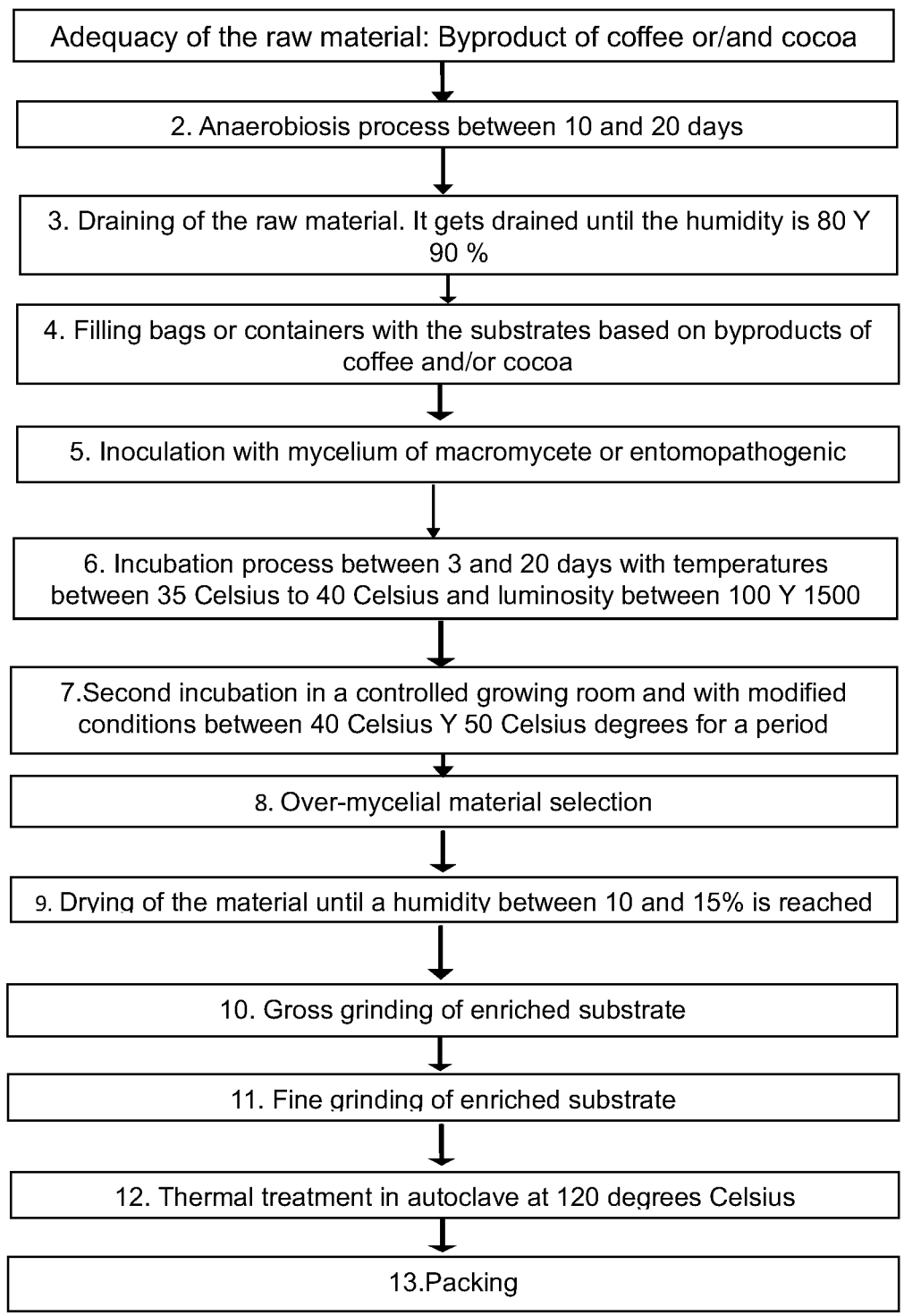
FIG. 3 describes the process of obtaining the functional food object of the invention.

Finally, coffee and cocoa by-products contain antioxidants, some protein, vitamins and minerals that are at this moment not being used because of their foul flavor and bad digestibility; the current invention rescues and improves the pre-existing properties of the by-products, which were inaccessible in its original state FIG. 3 describes the process of obtaining the functional food object of the invention.

This invention SHOWS A METHOD THAT refers to the production of dry food powder, called functional food, OBTAINED from by-products of the coffee and cacao industry transformed by entomopathogenic macromycetes such as:

*Cordyceps sinesis* y *Cordyceps militaris* and macromycetes such as *Ganoderma lucidum, Pleurotus ostreatus, P. sajor*-caju, *P. ostreatoroseus, P. eringii, Ganoderma lucidum, G. Applanatum, Ganoderma tsugae, Flammulina velutipes, Lentinula edodes, Lentinus strigellus, Morchella esculenta, M. conica, Macrolepiota procera, Volvariella volvacea, Grifola frondosa, Agaricus bisporus, A. blazeio A. brasiliensis, A. bitorques, A. brunnensis, Armillaria melea, Armillaria lutea, Oudemansiella canarii, Pycnoporus sanguineus, P. cinabarina, Tremella fuciformis, Coprinus comatus, Coprinus cinereus, Cantharellus cibarius, Hericium erinaceus, Boletus edulis, Agrocybe* spp., *Auricularia* spp., *Inocybe* spp., *Lactarius* spp., *Trametes* spp., *Fomes* spp., *Ramaria* spp., *Suillus* spp., *Collybia* spp., *Coriolus versicolor, Pholiota nameko, Schizophyllum comune*, which have known nutritional and medicinal properties, in order to obtain a product that has a high nutritional value.

This METHOD adds A GREATER nutritional value to the powders, making them rich in several components of the human and animal diet; at the same time, the manufacturing time is short which reduces the cost and the time of exit to the market in comparison with the current processes. These powders can be used for the domestic and industrial preparation/manufacture of foods such as vitamins, porridges, yogurts, soups, breads, biscuits, cakes, doughs, energy bars, cereals, fodder and the like. The method can also be used to obtain active ingredients (ergosterol, beta glucan, linoleic and oleic acid, lectins and such), enzymes, proteins, amino acids, vitamins, mineral salts and the like for use in food products, cosmetics industries, phytotherapy, pharmaceuticals, textiles, paper and medicine. Functional food contributes to the protein enrichment of foods and strengthens the immune system, giving value to its use in the treatment of diseases such as HIV or Cancer.

For the METHOD PROPOSED IN this invention the residual materials and by-products of the coffee and cacao process are used from the cultivation to the industrialization of the coffee and cocoa bean. These coffee by-products are: Coffee pulp, coffee husk, silver coffee film, coffee mucilage, leftover coffee grounds, and cut coffee wood (coffee tree sawdust). Cacao by-products are: Cacao shell, cacao mucilage known as cacao slime and bean husk.

THE METHOD PRESENTED IN THIS INVENTION HAS A PARALLEL PROCESS IN WHICH the inoculum is prepared FROM ONE of the varieties:

*Cordycepts sinesis* y *Cordyceps mititaris, Ganoderma lucidum, Pleurotus ostreatus, P. sajor*-caju, *P. ostreatoroseus, P. eringii, Ganoderma lucidum, G. Applanatum, Ganoderma tsugae, Flammulina velutipes, Lentinula edodes, Lentinus strigellus, Morchella esculenta, M. conica, Macrolepiota procera, Volvariella volvacea, Grifola frondosa, Agaricus bisporus, A. blazeio A. brasiliensis, A. bitorques, A. brunnensis, Armillaria melea, Armillaria lutea, Oudemansiella canarii, Pycnoporus sanguineus,*

*P. cinabarina, Tremella fuciformis, Coprinus comatus, Coprinus cinereus, Cantharellus cibarius, Hericium erinaceus, Boletus edulis, Agrocybe* spp., *Auricularia* spp., *Inocybe* spp., *Lactarius* spp., *Trametes* spp., *Fomes* spp., *Ramaria* spp., *Suillus* spp., *Collybia* spp., *Coriolus versicolor, Pholiota nameko, Schizophyllum commune.*

Once the above components are prepared, the process is developed from the inoculation of the byproducts with solid mycelium ner specific time, temperature, humidity, and light variables in order to produce the desired effect which is to improve the physicochemical properties of the by-products, so that they become edible, nutritional products of low cost and easy obtention; this way as a final result of the myceliation, a functional food is obtained. Functional food with characteristics of high increased protein and antioxidants. All this is achieved by the novelty use of by-products that would otherwise pollute the environment.

Another important characteristic of this invention is that the starting materials are not mixed with plaster (usually used in fungal cultures) because this invention is food.

The aforementioned byproducts that are the raw material of the method HAVE latent and inaccessible substances of great importance such as antioxidants, original protein, vitamins, minerals that cannot be used because of their bad taste and poor digestibility, however with the method disclosed in this invention, in which macromocytes and entomopathogenic macromycetes are used, these hidden preexisting qualities in the byproducts are rescued and improved. These substances where impossible to access in the original state of the by-product structure. This is a completely different method to the one known as "micelled green coffee beans" or "mycelial green cacao beans", which is a different technological method and purpose to be applied to market ready harvested beans.

The possibility of accessing and highlighting the properties of coffee and cacao by-products was unexpectedly obtained once the method of the invention was carried out, specifically in obtaining the attributes of such components such as digestibility, protein improvement, decrease in chlorogenic acids and tannins.

In table 8 the change in digestibility is observed in accordance with the decrease of tannins in the coffee pulp.

TABLE 8

Table of Variation % in content of Tannins.
Content of Tannins g/100 g

| Coffee Pulp | New Functional Food | % of Variation |
|---|---|---|
| 3.7 | 0.0304 | 99.178% |

Laboratorio Ciencia de los alimentos. Universidad Nacional de Colombia sede Medellin.

Cóodigo: LABCA-012. M.Sc., Dr. Benjamin Alberto Rojano. Octubre 02 de 2017.

Regarding caffeine, improvements are also observed, when the coffee pulp is subjected to the process of the invention, it decreases by 66%

TABLE 9

Caffeine content
Content of Caffeine g/100 g sample

| Coffee Pulp | New Functional food | % of variation |
|---|---|---|
| 1.3 | 0.44 | 66.1538462 |

Laboratorio de Analisis Instrumental. Universidad Nacional de Colombia, sede Medellin. Reporte No. 17-HPLC030. Quimico MSc. Jair Gaviria. Octubre 10 de 2017.

From the amino acid content, improvements in its content are observed, given that this laboratory study is reported.

TABLE 10

Amino Acids in a product of the invention:
Table of Aminoacids New Functional food

| ASP | 9.09 | g/16 gN |
| THE | 4.54 | g/16 gN |
| L-SERINE | 5.12 | g/16 gN |
| GLU | 10.76 | g/16 gN |
| GLY | 5.77 | g/16 gN |
| ALA | 5.41 | g/16 gN |
| VAL | 5.84 | g/16 gN |
| ILE | 4.04 | g/16 gN |
| LEU | 7.00 | g/16 gN |
| TYR | 3.61 | g/16 gN |
| PHE | 4.54 | g/16 gN |
| LYS | 3.46 | g/16 gN |
| HIS | 2.02 | g/16 gN |
| ARG | 3.53 | g/16 gN |

Inform 17-HPLC019. Universidad Nacional de Colombia-Campus-Medellín, Antioquia

Similarly, in the analysis of antioxidant activity and content of secondary metabolites with antioxidant properties on the product of the invention, it was found:

TABLE 11

Antioxidants Report:

TOTAL PHENOLS CONTENT

| SAMPLE | mg, Galic Acid/100 g sample | MEDIA | Standard deviation | Coefficient of variation |
|---|---|---|---|---|
| POWDER | 110.2 109.13 112.08 | 110.5 | 1.5 | 1.4 |

ANTIOXIDANT CAPACITY BY: ABTS

| SAMPLE | TEAC (μmol Trolox/100 g sample) | MEDIA | Standard deviation | Coefficient of variation |
|---|---|---|---|---|
| POWDER | 509.44 498.53 566.72 | 524.9 | 36.6 | 7 |

ANTIOXIDANT CAPACITY BY: DPPH

| SAMPLE | TEAC (μmol Trolox/100 g sample) | MEDIA | Standard deviation | Coefficient of variation |
|---|---|---|---|---|
| POWDER | 431.53 416.86 453.53 | 434 | 18.5 | 4.3 |

CAPACIDAD REDUCTORA POR: FRAP

| SAMPLE | mg of ascorbic acid/ 100 g sample | MEDIA | Standard deviation | Coefficient of variation |
|---|---|---|---|---|
| POWDER | 27.63 27.19 27.96 | 27.6 | 0.4 | 1.4 |

CONDENSED TANNINS CONTENT

| SAMPLE | mg, Catechin/ 100 g sample | MEDIA | Standard deviation | Coefficient of variation |
|---|---|---|---|---|
| POWDER | 29.81 28.49 32.87 | 30.4 | 2.2 | 7.4 |

TABLE 11-continued

Antioxidants Report:

TOTAL FLAVONOIDS CONTENT

| SAMPLE | mg, Catechin/ 100 g sample | MEDIA | Standard deviation | Coefficient of variation |
|---|---|---|---|---|
| POWDER | 11.64 10.91 11.94 | 11.5 | 0.5 | 4.6 |

ORAC VALUE

| SAMPLE | TEAC (µmol Trolox/100 g sample) | MEDIA | Standard deviation | Coefficient of variation |
|---|---|---|---|---|
| POWDER | 1450.2 1684.7 1533.6 | 1556.2 | 118.9 | 7.6 |

Laboratorio Ciencia de los alimentos. Universidad Nacional de Colombia sede Medellin.

Código: LABCA-012. M.Sc., Dr. Benjamin Alberto Rojano. October 02 de 2017.

The following table compares the amino acids of one of the new food products with known traditional foods. It can be observed that the figures are similar to some amino acids contained in the other foods.

TABLE 12

| | Corn | Soybean flour | Cotton seed flour | New Functional food based on coffee pulp |
|---|---|---|---|---|
| Aminoacid | | | | |
| Lysine | 1.7 | 6.3 | 4.3 | 3.46 |
| Histidine | 2.8 | 2.4 | 2.6 | 2.02 |
| Arginine | 3.1 | 7.2 | 11.2 | 3.53 |
| Threonine | 3.3 | 3.9 | 3.5 | 4.54 |

TABLE 12-continued

| | Corn | Soybean flour | Cotton seed flour | New Functional food based on coffee pulp |
|---|---|---|---|---|
| Cystine | 1 | 1.8 | 1.6 | |
| Methionine | 1.6 | 1.3 | 1.4 | |
| Valina | 5 | 5.2 | 4.9 | |
| Isoleucine | 4.3 | 5.4 | 3.8 | 4.04 |
| Leucine | 16.7 | 7.7 | 5.9 | 7.0 |
| Tyrosine | 5 | 3.2 | 2.7 | 3.61 |
| Phenylalanine | 5.7 | 4.9 | 5.2 | 4.54 |
| Hydroxyproline | | | | |
| Aspartic Acid | | | | 9.09 |
| Serine | | | | 5.12 |
| Glutamic Acid | | | | 10.76 |
| Proline | | | | |
| Glycina | | | | 5.77 |
| Alanine | | | | 5.41 |

Source: Bressani y col. Turrialba 22:299, 1972 and own data.

In laboratory tests, specifically with macromiceate, the following protein enrichment has been found.

TABLE 13

Cultivated Mushroom *Ganoderma lucidum*

| Substrates raw material | Initial Protein (N*6.25) | Final protein on substrate (N*4.38) | % Variation |
|---|---|---|---|
| Coffee Pulp | 10.31 | 26.56 | 157% |

Universidad de Caldas, noviembre 7 de 2017 Fisicoquimista Mauricio Sánchez Muñoz, Director Técnico Henry Hernán Castaño

TABLE NO. 14

This table No. 14 shows preferred examples of mixtures of performance of the invention in relation to the by-products of the raw material of the functional food:

| Raw Material | Coffee Pulp | Coffee Husk | Coffee Silver skin | Spent ground coffee | Coffee tree sawdust | Cocoa shell | Cocoa Mucilage | Cocoa Husk |
|---|---|---|---|---|---|---|---|---|
| Coffee Pulp C/N = 31 Humidity 78.56% | It can be used 100% pulp | Both ingredients can be mixed between 10-90% | Both ingredients can be mixed between 10-90% | Spent ground coffee can be used until 75% of the mixture and any quantity of coffee pulp | The coffee tree sawdust can be used until a maximum of 50% of the mixture in weight with the other ingredients | It can be mixed between 10% to 75% in weight of the cocoa shell | The cocoa mucilage and the coffee pulp can be mixed only 50% of each ingredient | The coffee pulp and the cocoa husk can be mixed between 10% and 90% of each ingredient |
| Coffee Husk C/N = 105 Humidity 12% | Both ingredients can be mixed between 10-90% | The coffee husk can be used alone 100% pouring water until the humidity is of 70% to 80% | Both ingredients can be mixed between 10-90% | Spent ground coffee can be used until 75% of the mixture with any quantity of coffee husk | The coffee tree sawdust can be used until a maximum of 50% of the mixture in weight with the other ingredients | It can be mixed between 10% to 75% in weight of the cocoa shell | The cocoa mucilage and the coffee husk can be mixed only 50% of each ingredient | Both ingredients can be mixed between 10-90% |
| Spent ground coffee | The spent ground coffee can be a | The spent ground coffee can be a | The spent ground coffee can be a | The spent ground coffee can be a | The coffee tree sawdust can be mixed | The cocoa shell until 75% of the | The cocoa mucilage could be | The spent ground coffee can be mixed |

TABLE NO. 14-continued

This table No. 14 shows preferred examples of mixtures of performance of the invention in relation to the by-products of the raw material of the functional food:

| Raw Material | Coffee Pulp | Coffee Husk | Coffee Silver skin | Spent ground coffee | Coffee tree sawdust | Cocoa shell | Cocoa Mucilage | Cocoa Husk |
|---|---|---|---|---|---|---|---|---|
| C/N: 33 Humidity 60.01% | part of this mixture only until 75% of it | part of this mixture only until 75% of it | part of this mixture only until 75% of it | part of this mixture only until 75% of it, but has to be mixed with another byproduct | until 50% of the total mixture and the spent ground coffee until 75% | mixture and the spent ground coffee until 75% of the mixture | mixed until 50% and the spent ground coffee until 75% | until 75% of the mixture and any quantity of the cocoa husk |
| Coffee tree Sawdust C/N: 74 Humidity 14.20% | The coffee tree sawdust can be used until a maximum of 50% of the mixture in weight with the other ingredients | The coffee tree sawdust can be used until a maximum of 50% of the mixture in weight with the other ingredients | The coffee tree sawdust can be used until a maximum of 50% of the mixture in weight with the other ingredients | The coffee tree sawdust can be mixed until 50% of the total mixture and the spent ground coffee until 75% | The coffee tree sawdust can be used until a maximum of 50% of the mixture in weight with the other ingredients | The coffee tree sawdust can be mixed until 50% and the cocoa shell until 75% in weight | The cocoa mucilage can be mixed until 50% of the mixture and the coffee tree sawdust until 50% | The coffee tree sawdust can be mixed from 10% to 50% of the mixture |
| Silver skin C/N = 22 Humidity 16% | Both ingredients can be mixed between 10-90% | Both ingredients can be mixed between 10-90% | The silver skin can be used 100% as substrate | The spent ground coffee can be a part of this mixture only until 75% of it | The coffee tree sawdust can be mixed until 50% of the mixture | The cocoa shell can be used until 75% in weight and any quantity of silver skin | The cocoa mucilage can be combined until 50% in weight and any quantity of the silver skin | Both ingredients can be mixed between 10-90% |
| Cocoa shell C/N: 10.78 humidity 82.39% | It can be mixed between 10% to 75% in weight of the cocoa shell | It can be mixed between 10% to 75% in weight of the cocoa shell | It can be mixed between 10% to 75% in weight of the cocoa shell with any quantity of silver film | The cocoa shell until 75% of the mixture and the spent ground coffee until 75% of the mixture | The coffee tree sawdust can be mixed until 50% and the cocoa shell until 75% in weight | It can be used until 75% for the mixture in weight. It has to be mixed with other byproduct | The cocoa mucilage can be mixed until 50% of the mixture in weight | Both ingredients can be mixed between 10-90% |
| Cocoa mucilage C/N: 28.41 humidity 80% | The cocoa mucilage and the coffee pulp can be mixed only 50% of each ingredient | The cocoa mucilage and the coffee husk can be mixed only 50% of each ingredient | The cocoa mucilage can be combined until 50% in weight and any quantity of the silver skin | The cocoa mucilage could be mixed until 50% and the spent ground coffee until 75% | The cocoa mucilage can be mixed until 50% of the mixture and the coffee tree sawdust until 50% | The cocoa mucilage can be mixed until 50% of the mixture weight | The cocoa mucilage can be used 100% as substrate | Cocoa mucilage can be used until 50% of the mixture with Coffee husk |
| Cocoa Husk C/N: 2.06 humidity 6.32% | The coffee pulp and the cocoa husk can be mixed between 10% and 90% of each ingredient | Both ingredients can be mixed between 10-90% | Both ingredients can be mixed between 10-90% | The spent ground coffee can be mixed until 75% of the mixture and any quantity of the cocoa husk | The coffee tree sawdust can be mixed from 10% to 50% of the mixture | Both ingredients can be mixed between 10-90% | Cocoa mucilage can be used until 50% of the mixture with Coffee husk | The coffee husk can be used 100% as substrate |

The past mixtures shown in the table are calculated with the natural humidities from the raw materials. The final substrates have humidities between 80% and 90%.
In these substrates Calcium carbonate and gypsum are not used
The byproducts: Coffee pulp, Silver skin, coffee husk, cocoa husk, cocoa mucilage can be used 100% as substrate.
The spent ground coffee, and cocoa shell can be used until 75% of the mixture. To use spent ground coffee as an only ingredient it has to be miceliated with two different macromycetes.
The cocoa mucilage in mixtures, can be used between 10% and 50% depending on the other byproduct that is used.
The coffee tree sawdust can't be used alone and its maximum quantity in weight is until 50%. To use it 100% as substrate must be miceliated with two different macromycetes.

The mixtures above are calculated with the initial natural humidity of the raw materials and the final moisture content of the mixture is sought between 80 and 90%. Neither Calcium Carbonate nor plaster are used, as it is usually used in formulations for the production of the fruiting body.

The byproducts: coffee pulp, silver coffee film, coffee cisco, cacao shell, cacao slime and cacao husk can each be used 100% as a substrate.

The coffee grounds residue can be used up to a maximum of 75% of the final mixture. In order to use 100% of the coffee beans residue as a substrate, it must be micelled with two different macromycetes.

In mixtures, the cacao slime can be used between 10 and 50% depending on the other by-product with which it is mixed.

Coffee tree sawdust cannot be used alone and its maximum contribution in the mixture is up to 50%. To use it 100% it must be micelled with two different macromycetes.

As an example of the embodiment of the invention, the mixture of cocoa husk with coffee husk at 50% in dry weight each is shown below, taking the values shown in the above table as follows:

1—It can be mixed from 10% to 75% of cocoa husk. This means that of the two components only those percentages of cocoa husk can be mixed and the rest is COMPLETED WITH coffee husk.

2—The cocoa husk is a material from the cultivation of cocoa, therefore it is found after the break of the pod as a by-product. Once the pod is broken and crushed in the process of the farm, the material is adapted, that is, it is ready to be mixed.

3—On the other hand, the cisco or coffee husk is found as a residue of threshing and its particle is small, it is simply mixed with the other material.

4—The humidity of the final mixture depends on the humidity of the two components (coffee husk 12%—cocoa husk 82.39%)

5—The mixture is subjected to anaerobiosis with the natural moisture of the mixture EXAMPLE OF FORMULATION
COCOA HUSK-COFFEE HUSK
To have 50% of both products by weight dry base

| Material | Moist kilos | Humidity | Dry weight | % in dry | Water |
|---|---|---|---|---|---|
| Cocoa husk | 283.93 | 82% | 50 | 50.00 | 232.82226 |
| Coffee husk | 56.82 | 12% | 50 | 50.00 | 6.81818182 |
| Mixture natural humidity | | | | | 70.3278099 |

Then the following general steps of the process are followed:

Draining, filling the container, inoculation, first incubation, second incubation, selection of mycelium, drying, coarse grinding enriched substrate, fine grinding, heat treatment, packing.

Once the process disclosed in this invention has been carried out, it has been possible to verify the surprising effect when macromycetes and some entomopathogenic macromycetes are combined with the coffee and/or cacao by-products.

In the search to find new sources of protein it has been found that macromycetes increase the protein level of the substrate in which they are grown.

Seeking to enrich the fungus in its protein content using the by-products, this procedure grows the macromycetes in a substrate rich in nitrogen, minerals and antioxidants that when transformed by the fungus also increase in a substantial way the content of these elements.

However, with this procedure it wasn't expected for the fungi to perform as well if micelled on coffee and/or cacao byproducts since they had always been grown on raw materials with a high content of cellulose and lignin, because their cultivation sought degradation of lignin and cellulose through transformation with fungi; it had also had been used on cereals and green beans of cacao and coffee, but never on their byproducts.

Therefore, the solution provided by this invention is a development that exploits, enriches, makes digestible and improves the palliative qualities of by-products resulting from the process of cultivation and industrialization of coffee and cacao, through the transformation produced by the mycelium of the macromycete or the entomopathogenic macromycete that grows directly in the biomass of the by-product, decomposing the fibers, secreting enzymes, exfoliating, and enriching the material with proteins, vitamins and mineral salts.

Regarding the time of production of the functional food, this invention also provides clear advantages in that the total time of production of the functional food takes a total of between 28 and 38 days, which is a short time keeping in mind the process and the materials used in the invention, which require special times and temperatures.

Process of Obtaining Functional Food.

This inventive process is developed from all the byproducts of the process, post-harvest and industrialization of coffee and cacao; these are: coffee pulp, coffee husk, silver coffee film, coffee mucilage, coffee grounds residue, coffee tree sawdust, cacao husk, cacao slime, and cacao husk, which are the exocarp, mesocarp, endocarp and epidermis of the fruits, all of them exterior to the so-called green coffee and cacao almond; these by-products are not mixed with other components.

The other raw material of the invention is entomopathogenic macromycete mycelium as *Cordyceps sinesis* y *Cordyceps militaris*, and macromycete preferably: *Pleurotus ostreatus, P. sajor*-caju, *P. ostreatoroseus, P. eringii, Ganoderma lucidum, G. Applanatum, Ganoderma tsugae, Flammulina velutipes, Lentinula edodes, Lentinus strigellus, Morchella esculenta, M. conica, Macrolepiota procera, Volvariella volvacea, Grifola frondosa, Agaricus bisporus, A. blazei o A. brasiliensis, A. bitorques, A. brunnensis, Armillaria melea, Armillaria lutea, Oudemansiella canarii, Pycnoporus sanguineus, P. cinabarina, Tremella fuciformis, Coprinus comatus, Coprinus cinereus, Cantharellus cibarius, Hericium erinaceus, Boletus edulis, Agrocybe* spp., *Auricularia* spp., *Inocybe* spp., *Lactarius* spp., *Trametes* spp., *Fomes* spp., *Ramaria* spp., *Suillus* spp., *Collybia* spp., *Coriolus versicolor, Pholiota nameko, Schizophyllum comune*"

This invention is characterized by having the following steps:

1. Adequacy of the raw material: The materials or byproducts of the production of coffee and/or cacao, coffee pulp, coffee husk and silver coffee film, cacao shell, coffee grounds residue, coffee mucilage, sawdust of coffee tree, cacao slime, and cacao husk, are selected and/or mixed, then they are placed in sacks and prepared.

2. Anaerobiosis: Once the materials are selected, they are immersed in water for 10 to 20 days, causing fermentation and the elimination of microorganisms that live in aerobic conditions, this anaerobiosis also allows the reduction of chlorogenic acids. Such water is previously available in tanks.

3. Draining of the material: Once the anaerobic period has ended, the sacks with the by-products are extracted and drained until obtaining humidity levels of 80 to 90%.

4. Filling bags or containers: Bags, plastic containers or trays are filled with a certain weight to the selected substrate, which already have the necessary humidity for the next step.

5. Inoculation: Sowing is carried out on the chosen substrate with solid inoculum of macromycete or entomopathogenic macromycete inside the bags, trays or containers already prepared, and homogeneously mixed, where such macromycete inoculum used in the process may comprise at least one of the following:

Pleurotus ostreatus, P. sajor-caju, P. ostreatoroseus, P. eringii, Ganoderma lucidum, G. Applanatum, Ganoderma tsugae, Flammulina velutipes, Lentinula edodes, Lentinus strigellus, Morchella esculenta, M. conica, Macrolepiota procera, Volvariella volvacea, Grifola frondosa, Agaricus bisporus, A. blazeio A. brasiliensis, A. bitorques, A. brunnensis, Armillaria melea, Armillaria lutea, Oudemansiella canarii, Pycnoporus sanguineus, P. cinabarina, Tremella fuciformis, Coprinus comatus, Coprinus cinereus, Cantharellus cibarius, Hericium erinaceus, Boletus edulis, Agrocybe spp., Auricularia spp., Inocybe spp., Lactarius spp., Trametes spp., Fomes spp., Ramaria spp., Suillus spp., Collybia spp., Coriolus versicolor, Pholiota nameko, Schizophyllum comune, o donde el inoculo de macromycete entomopathogen puede comprender Cordyceps sinesis o Cordyceps militaris, 6. Incubation: The bags are placed in a growing room with controlled temperature and luminosity, this incubation period takes between 3 and 20 days at a temperature between 35 to 40 degrees Celsius, with luminosity between 100 and 1500 lux. These temperatures don't allow the fruiting body of the fungus to appear, but it does enrich the substrate by transforming the mushroom mycelium on this substrate.

7. Second incubation: once the incubation is finished or the biomass is colonized, a modification of its temperature variables is carried out, it is increased from 40 to 50 degrees Celsius for 4 to 8 days looking for an accelerated colonization and greater degradation of the structures of the material, to the point of bringing the mycelium to overproduction and preventing the growth of the hat (carpophore).

8. Over-mycelial material selection: The blocks that have the highest amount of mycelium or over-mycelial are chosen.

9. Drying of the material: chosen material, is placed in silo dryers (air) or by solar exposure, or any method of drying to obtain humidity levels between 10 and 15%.

10. Gross grinding of enriched substrate: The material chosen is taken to a mill of blades and hammers to make a first grind to obtain a small particle.

11. Fine grinding of enriched substrate: The material enters a high-speed mill, which makes the particle much smaller to obtain a fine powder 12. Thermal treatment in autoclave: The material is taken to an autoclave for a thermal treatment at 120 degrees Celsius, between 30 and 60 minutes and competing particles and unwanted microorganisms are eliminated.

13. Packing: After having a sterile material with the heat treatment, it is packed in the packing units that the market requires.

Each of the following terms: 'includes', 'including', 'has', 'having', 'comprises', and 'comprising', and, their linguistic, as used herein, means 'including, but not limited to', and is to be taken as specifying the stated component(s), feature(s), characteristic(s), parameter(s), integer(s), or step (s), and does not preclude addition of one or more additional component(s), feature(s), characteristic(s), parameter(s), integer(s), step(s), or groups thereof. Each of these terms is considered equivalent in meaning to the phrase 'consisting essentially of'.

Each of the phrases 'consisting of' and 'consists of', as used herein, means 'including and limited to'.

The term 'method', as used herein, refers to steps, procedures, manners, means, or/and techniques, for accomplishing a given task including, but not limited to, those steps, procedures, manners, means, or/and techniques, either known to, or readily developed from known steps, procedures, manners, means, or/and techniques, by practitioners in the relevant field(s) of the disclosed invention.

Throughout this disclosure, a numerical value of a parameter, feature, characteristic, object, or dimension, may be stated or described in terms of a numerical range format. Such a numerical range format, as used herein, illustrates implementation of some exemplary embodiments of the invention, and does not inflexibly limit the scope of the exemplary embodiments of the invention. Accordingly, a stated or described numerical range also refers to, and encompasses, all possible sub-ranges and individual numerical values (where a numerical value may be expressed as a whole, integral, or fractional number) within that stated or described numerical range. For example, a stated or described numerical range 'from 1 to 6' also refers to, and encompasses, all possible sub-ranges, such as 'from 1 to 3', 'from 1 to 4', 'from 1 to 5', 'from 2 to 4', 'from 2 to 6', 'from 3 to 6', etc., and individual numerical values, such as '1', '1.3', '2', '2.8', '3', '3.5', '4', '4.6', '5', '5.2', and '6', within the stated or described numerical range of 'from 1 to 6'. This applies regardless of the numerical breadth, extent, or size, of the stated or described numerical range.

Moreover, for stating or describing a numerical range, the phrase 'in a range of between about a first numerical value and about a second numerical value', is considered equivalent to, and meaning the same as, the phrase 'in a range of from about a first numerical value to about a second numerical value', and, thus, the two equivalently meaning phrases may be used interchangeably.

The term 'about', is some embodiments, refers to ±30% of the stated numerical value. In further embodiments, the term refers to ±20% of the stated numerical value. In yet further embodiments, the term refers to ±10% of the stated numerical value.

It is to be fully understood that certain aspects, characteristics, and features, of the invention, which are, for clarity, illustratively described and presented in the context or format of a plurality of separate embodiments, may also be illustratively described and presented in any suitable combination or sub-combination in the context or format of a single embodiment. Conversely, various aspects, characteristics, and features, of the invention which are illustratively described and presented in combination or sub combination in the context or format of a single embodiment, may also be illustratively described and presented in the context or format of a plurality of separate embodiments.

Although the invention has been described in conjunction with specific embodiments thereof, it is evident that many alternatives, modifications, and variations will be apparent to those skilled in the art. Accordingly, it is intended to embrace all such alternatives, modifications, and variations that fall within the spirit and broad scope of the appended claims.

All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

The invention claimed is:

1. A process for obtaining a functional food, comprising: adaptation of a raw material composed of one of by-products selected from the group of coffee pulp, coffee husk, silver coffee film, coffee tree sawdust, coffee grounds residue, coffee mucilage, cacao shell, cacao slime, and cacao husk, or a combination thereof, wherein the adaption of the raw material occurs by of the following steps:
   a. anaerobic process;
   b. draining of raw material;
   c. filling bags or containers with the mixture;
   d. inoculation of macromycete mycelium or entomopathogenic macromycete;
   e. incubation of the macromycete mycelium or the entomopathogenic macromycete, wherein the incubation takes between 3 and 20 days, at a temperature of 35 to 40 degrees Celsius, with luminosity between 100 and 1500 lux;
   f. second incubation of the macromycete mycelium or the entomopathogenic macromycete, wherein the second incubation takes between 4 to 8 days at a temperature of 40 to 50 degrees Celsius;
   g. selection of over-myceliated material;
   h. drying of the material;
   i. gross grinding of an enriched substrate;
   j. fine grinding of the enriched substrate;
   k. thermic treatment; and
   l. packing.

2. The process of claim 1, wherein an anaerobiosis time is between 10 and 20 days.

3. The process of claim 1, wherein once the raw material has been removed from water, the raw material is drained until reaching a humidity of 80 to 90%.

4. The process of claim 1, wherein the raw material is dried to obtain humidity between 10 and 15%.

5. The process of claim 1, wherein the product heat treatment is 120 degrees Celsius for a time between 30 and 60 minutes.

6. The process of claim 1, thereby obtaining active ingredients selected from the group consisting of ergosterol, beta glucan, linoleic and oleic acid, lectins, enzymes, proteins, amino acids, vitamins, and mineral salts.

7. The process of claim 1, wherein the functional food is one of food products, nutritional supplements, cosmetics, herbal medicine, pharmaceuticals, textiles, paper or medicine.

* * * * *